United States Patent
Oka et al.

(10) Patent No.: US 7,369,183 B2
(45) Date of Patent: May 6, 2008

(54) IMAGE DISPLAY APPARATUS (75) Inventors: Naoya Oka, Yokohama (JP); Ryo Hasegawa, Yokohama (JP); Yasutaka Tsuru, Kamakura (JP); Hiroshi Aoki, Yokohama (JP); Hirofumi Sakamoto, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 527 days.

(21) Appl. No.: 11/063,752

(22) Filed: Feb. 24, 2005

(65) Prior Publication Data
US 2006/0061842 A1 Mar. 23, 2006

(30) Foreign Application Priority Data
Sep. 21, 2004 (JP) .............................. 2004-272691

(51) Int. Cl.
H04N 5/202 (2006.01)
H04N 9/69 (2006.01)
H04N 5/14 (2006.01)

(52) U.S. Cl. ...................... 348/674; 348/672; 348/675

(58) Field of Classification Search ................ 348/674, 348/671, 672, 675, 649, 650, 645–647; 382/168, 382/274, 172, 167; 358/522, 520; H04N 5/14, H04N 5/202, 9/69
See application file for complete search history.

(56) References Cited

U.S. PATENT DOCUMENTS 6,798,544 B1 * 9/2004 Chiba et al. ................ 358/3.22
6,850,214 B2 * 2/2005 Nishitani et al. ............. 345/87
6,963,663 B1 * 11/2005 Yoshida ..................... 382/167
2005/0058341 A1 * 3/2005 Maruoka ..................... 382/167

FOREIGN PATENT DOCUMENTS

| JP | 08-317250 | 11/1998 |
|---|---|---|
| JP | 2000-307896 | 11/2000 |
| JP | 2001-189861 | 7/2001 |
| JP | 2003-219205 | 7/2003 |
| JP | 2004-198479 | 7/2004 |

* cited by examiner

Primary Examiner—Sherrie Hsia
(74) Attorney, Agent, or Firm—McDermott Will & Emery LLP (57) ABSTRACT

The present invention provides a technique for performing gamma correction processing when there are a plurality of characteristic areas, each of which is characterized by the high frequency in a luminance histogram to improve the impression of contrast. According to the present invention, a luminance characteristic detector (4) detects the luminance of an input image signal and a microcomputer (5) calculates an APL and a luminance histogram of an input image signal. A gamma correction circuit (6) performs the gamma correction processing in response to the luminosity of the input image signal by use of the result of the calculation carried out by the microcomputer (5). Then, if there are a plurality of characteristic areas, each of which is characterized by the high frequency in the luminance histogram, a characteristic emphasis circuit (7) performs grayscale extension processing for the plurality of characteristic areas. This makes it possible to perform the most suitable processing in response to the input image signal so that the impression of contrast is improved.

12 Claims, 10 Drawing Sheets

IMAGE DISPLAY APPARATUS

CLAIM OF PRIORITY

The present application claims priority from Japanese application serial no. P2004-272691, filed on Sep. 21, 2004, the content of which is hereby incorporated by reference into this application.

BACKGROUND OF THE INVENTION (1) Field of the Invention

The present invention relates to an image display apparatus such as a television receiver, and more particularly to an image display apparatus comprising an image processing circuit that detects characteristics of an input image signal to correct the grayscale thereof.

(2) Description of the Related Art

For example, Japanese Patent Laid-Open No. Hei 8-317250 (patent document 1) and Japanese Patent Laid-Open No. 2000-307896 (patent document 2) disclose techniques used to improve the impression of contrast. These techniques are used for, for example, display units for displaying images.

The patent document 1 discloses the technique in which a luminance histogram and an average luminance level (it might be called an Average Peak Level or Average Picture Level, hereinafter referred to as "APL") are calculated from an input image signal, and thereby a gamma curve used for gamma correction is set by use of the luminance histogram and the APL.

The patent document 2 discloses the technique in which an area characterized by the high frequency in a luminance histogram is calculated from an input image signal, and thereby a luminance-value correction parameter is calculated in response to the frequency of the area to set a gamma curve.

SUMMARY OF THE INVENTION

The above-mentioned patent documents 1 and 2 do not take into consideration a case where there are a plurality of dispersed areas each characterized by the high frequency in the luminance histogram (hereinafter referred to as "characteristic areas"). If there are the plurality of dispersed characteristic areas, a range to be identified increases, making it difficult to make the tilt of a gamma curve steep. As a result, very little effect of improving the impression of contrast is produced. Moreover, a portion in which an input amplitude level is high, or a portion in which an input amplitude level is low, may include an area characterized by the high frequency in a luminance histogram. If such an area is not within a specific range, the correction processing is not carried out. In this case, images would collapse or skip.

To be more specific, as far as the techniques described in the patent documents 1 and 2 are concerned, if the number of characteristic areas is one, processing which is most suitable for improving the impression of contrast may be performed. However, if there are a plurality of characteristic areas, it is difficult to perform the most suitable processing. Furthermore, in the techniques described in the patent documents 1 and 2, the color correction to be performed by use of a detected histogram is also not taken into consideration.

The present invention has been devised taking the above-mentioned situations into consideration. The present invention, therefore, provides a technique capable of displaying a high quality image with satisfactorily improved contrast. In addition, the present invention provides a technique capable of displaying a high quality image through good color correction.

An image display apparatus according to the present invention is characterized by a configuration as described below. To be more specific, an APL and a luminance histogram are detected in a luminance signal in a period of one field or one frame. Next, the frequency of the luminance histogram is analyzed on the basis of the detected luminance histogram, and the luminance histogram is divided into three areas: a luminance-histogram low area; a luminance-histogram middle area; and a luminance-histogram high area. Then, one of these areas corresponding to the input image signal is determined. Based on the result of the determination, a gamma curve corresponding to the luminosity of the input image signal is selected and calculated by use of the APL according to a gamma-curve switching characteristic associated with the selected area. Then the adaptation to the gamma curve is performed. Moreover, for the obtained gamma curve, a characteristic area, which is characterized by the high frequency and accordingly should be emphasized, is analyzed by use of the luminance histogram, and the grayscale thereof is then extended. Even if there are a plurality of characteristic areas, this processing is applicable and is successively executed. Accordingly, it becomes possible to acquire the most suitable gamma curve for each input image signal.

As far as the gamma curve is concerned, if an output amplitude level is lower than an input amplitude level, the color becomes deep. As a result, color collapse or the like may occur. Therefore, the amplitude of color saturation is to be adjusted in response to a degree of the corrected gamma curve. This makes it possible to set the color density that is suitable for the corrected gamma curve, and accordingly it becomes possible to prevent the color collapse or the like from occurring.

According to the above configuration of the present invention, for example, even if an inputted image, the luminance of which is high as a whole, partially includes an area, the luminance of which is low, or even if an inputted image, the luminance of which is low as a whole, partially includes an area, the luminance of which is high, it is possible to calculate, from a plurality of gamma curves, a gamma curve that is most suitable for the input image signal. Thus, it is possible to extend the grayscale of all areas, the impression of contrast of which is to be improved. This enables gamma correction processing that is most suitable for a plurality of areas. In other words, according to the present invention, it becomes possible to display a high quality image.

DETAILED DESCRIPTION OF THE PREFERRED EMBODIMENTS

Embodiments of the present invention will be described with reference to drawings as below.

First Embodiment

Figure 1:
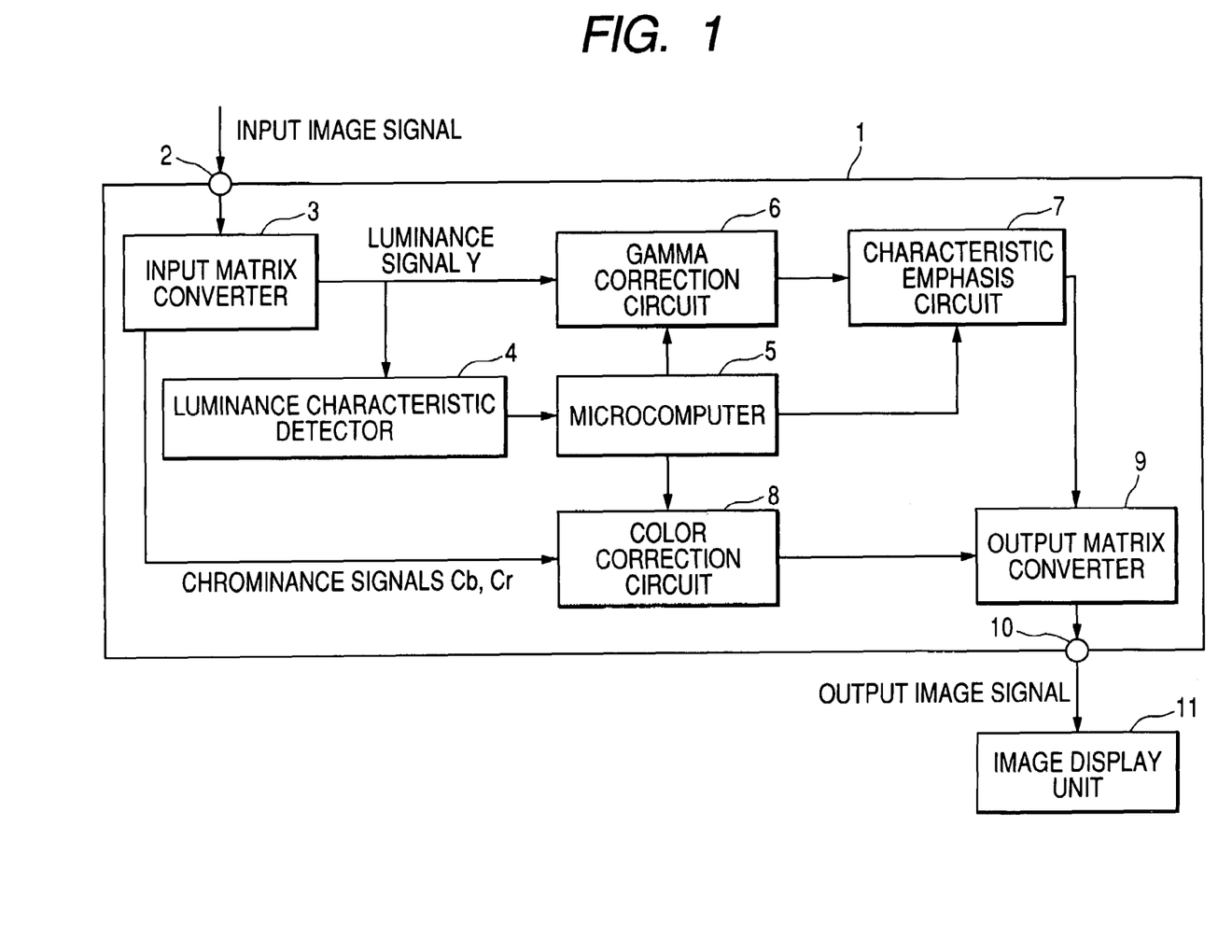
FIG. 1 is a basic configuration diagram illustrating an image processing circuit according to a first embodiment of the present invention.

FIG. 1 is a block diagram illustrating an image processing unit according to a first embodiment of the present invention. In FIG. 1, reference numeral 1 denotes an image processing unit; reference numeral 2 denotes an input terminal for an image signal. Reference numeral 3 denotes an input matrix converter for converting RGB signals such as PC (personal computer) signals, and a signal format such as image signals (Y, Pb, Pr/Y, Cb, Cr) into a luminance signal Y and chrominance signals Cb, Cr. Reference numeral 4 denotes a characteristic detector for detecting an APL and a luminance histogram by the luminance signal Y. Reference numeral 5 denotes operation control means (hereinafter referred to as "microcomputer") for generating various control signals on the basis of information detected by the luminance characteristic detector 4. Reference numeral 6 denotes a gamma correction circuit for performing gamma correction processing in response to the luminosity of an input image signal. Reference numeral 7 denotes a characteristic emphasis circuit for extending the grayscale of a characteristic area analyzed by the luminance histogram. Reference numeral 8 denotes a color correction circuit for adjusting the amplitude of saturation in response to the amount of correction of the gamma correction processing. Reference numeral 9 denotes an output matrix converter for converting image signals (Y, Cb, Cr) into a signal format that is suitable for a panel. Reference numeral 10 denotes an output terminal for outputting an image signal; and reference numeral 11 denotes an image display unit.

The input image signal is inputted into the input terminal 2 of the image processing unit 1. The input image signal which is inputted into the input terminal 2 is converted into the luminance signal Y and the chrominance signals Cb, Cr by the input matrix converter 3. It is to be noted that any signal format such as RGB signals (for example, PC signals) and image signals (Y, Pb, Pr/Y, Cb, Cr) may also be used as a format of the input image signal. The luminance characteristic detector 4 detects, from the luminance signal Y, an APL and a luminance histogram in an image period of one field or one frame. Information about the APL and the luminance histogram, which have been detected, is inputted into the microcomputer 5. From the inputted information about the APL and the luminance histogram, the microcomputer 5 analyzes a characteristic area according to distribution properties of the luminance histogram, and then forms a luminance control signal on the basis of the result of the analysis. The microcomputer 5 outputs the luminance control signal to the gamma correction circuit 6 and the characteristic emphasis circuit 7. The luminance control signal formed by the microcomputer 5 controls the gamma correction circuit 6 to calculate a gamma curve that is most suitable for the luminosity of the luminance signal Y, and to make the adaptation to the gamma curve. Next, the characteristic emphasis circuit 7 performs the control so that the grayscale of the characteristic area analyzed by the luminance histogram is extended by use of the gamma curve. The extended signal is then output to the output matrix converter 9. Here, as described above, the gamma correction circuit 6 placed before the characteristic emphasis circuit 7 calculated the gamma curve from the luminance control signal, and then makes the adaptation to the gamma curve. In addition, the color correction circuit 8 adjusts the amplitude of color saturation corresponding to the amount of correction of the gamma curve acquired by the gamma correction processing, and then outputs the corrected signal to the output matrix converter 9. The output matrix converter 9 converts the luminance signal Y generated by the characteristic emphasis circuit 7 and the chrominance signals Cb, Cr generated by the color correction circuit 8 into a signal format associated with the image display unit 11, and then outputs the converted signal to the output terminal 10. The image display unit 11 displays the output image signal that is output from the output terminal 10. Here, as a result of the above processing, the impression of contrast of the output image signal is improved as compared with that of the input image signal.

Next, what will be described in detail with reference to FIGS. 2 through 6 is gamma correction processing that is performed by the luminance characteristic detector 4, the microcomputer 5, the gamma correction circuit 6, and the characteristic emphasis circuit 7 according to this embodiment on the basis of the APL and the luminance histogram which have been detected.

Figure 2A:
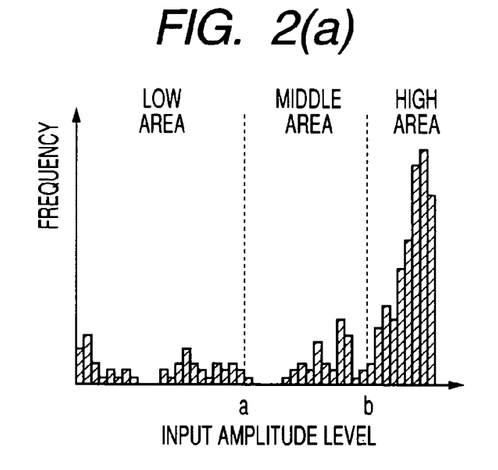
FIGS. 2A, 2B, 2C, 2D, 2E are graphs each illustrating the gamma correction that uses an APL and a luminance histogram according to the present invention.

FIGS. 2A, B, C, D, E are graphs illustrating a calculation method used in the microcomputer 5 that uses the result of detecting the APL and the luminance histogram by the luminance characteristic detector 4, and an image-quality improvement method using the gamma correction processing performed by the gamma correction circuit 6.

FIG. 2A is a graph illustrating the result of detecting the luminance histogram for a certain input image signal. What is analyzed in this embodiment is the frequency in the luminance histogram detected by the luminance characteristic detector 4. Here, an input amplitude level is divided into three areas: a luminance-histogram low area, an input amplitude level of which is smaller than or equal to a point a shown in FIG. 2A; a luminance-histogram middle area, an input amplitude level of which is between the point a and a point b; and a luminance-histogram high area, an input amplitude level of which is larger than or equal to the point b. One of these areas corresponding to the input image signal is selected. The area selection is made by: arbitrarily providing each of the three areas with a boundary value; and making a judgment by the microcomputer 5 as to whether or not the sum of frequencies in each area exceeds the boundary value thereof. There is also an area selection method comprising the steps of: for each of the three areas, calculating a ratio of the sum of frequencies to the width of the area based on the input amplitude level by the microcomputer 5; and selecting an area, the calculated ratio of which is the largest. For example, according to the result of detecting the luminance histogram shown in FIG. 2A, the frequency is high in the luminance-histogram high area. Accordingly, it is judged that the boundary value which is arbitrarily set is exceeded in the luminance-histogram high area. As a result, the luminance-histogram high area is selected.

Figure 2B:
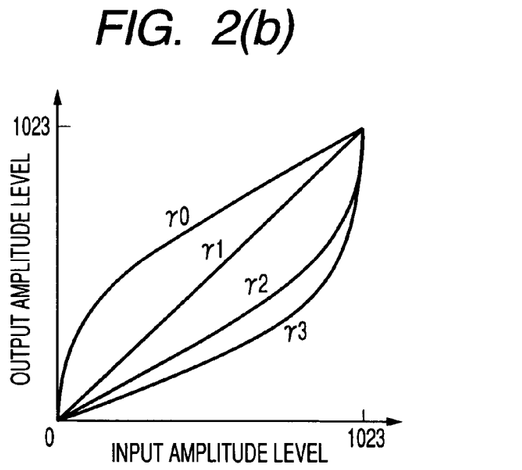

FIG. 2B is a graph illustrating a plurality of gamma curve characteristics to which the gamma correction circuit 6 makes the adaptation. In the figure, "γ1" is a linear gamma curve in which a level of input/output characteristics (that is to say, an output level relative to the input) does not increase or decrease in a specific area. "γ0" is a gamma curve in which a level of input/output characteristics is higher than that of "γ1" in all areas—in particular, the level of input/output characteristics increases in a low luminance area. "γ2" is a gamma curve in which a level of input/output characteristics is lower than that of "γ1" in all areas—in particular, the level of input/output characteristics increases in a high luminance area. "γ3" is a gamma curve in which a level of input/output characteristics is lower than that of "γ2" in all areas—in particular, the largest increase in level of input/output characteristics is shown in the high luminance area. "γ1" can be set not only as the linear gamma curve characteristic but also as a nonlinear gamma curve characteristic.

Figure 2C:
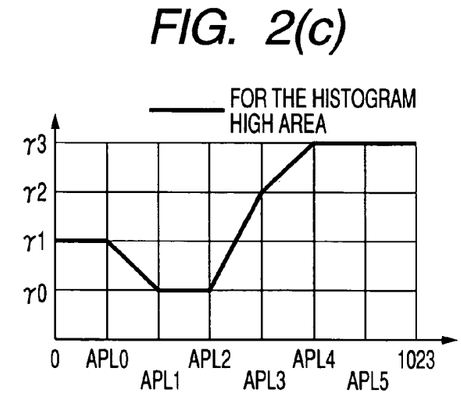
Figure 2D:
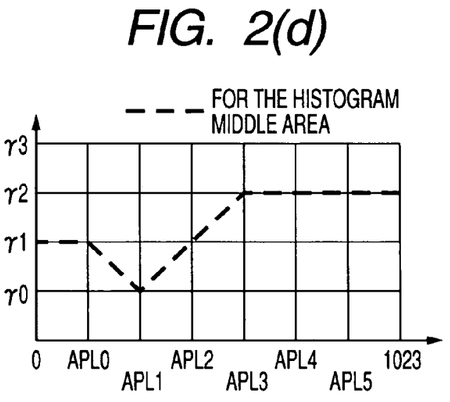
Figure 2E:
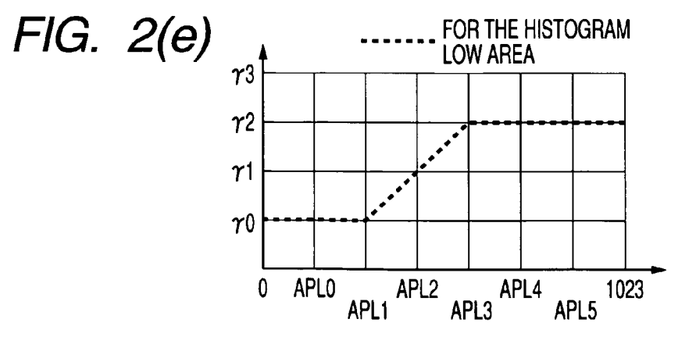

FIGS. 2C, 2D, 2E are graphs each illustrating how to automatically switch to one of the gamma curves shown in FIG. 2B in response to an APL of an input image signal on the basis of the area selection made by use of the luminance histogram shown in FIG. 2A. A gamma-curve switching characteristic is given to each of the three luminance histogram areas described with reference to FIG. 2A. To be more specific, if the luminance-histogram high area in FIG. 2A is selected, the gamma curve characteristic is switched as shown in FIG. 2C. In FIG. 2C, each of APL0 through APL5 is a switching point at which each average luminance level (APL) which is individually set is switched. If the APL is a value ranging from 0 to APL0, the gamma curve "γ1" is selected. If the APL is a value ranging from APL1 to APL2, the gamma curve "γ0" is selected. If the APL is APL3, the gamma curve "γ2" is selected. If the APL is a value ranging from APL4 to 1023, the gamma curve "γ3" is selected. Here, a gamma curve between APL0 and APL1 is determined by the arithmetic operation of the microcomputer 5 so that the gamma curve linearly changes from "γ1" to "γ0" (a transition state of the gamma curve will be described in detail in the subsequent FIG. 3). A gamma curve between APL2 and APL3 is determined in like manner by the arithmetic operation of the microcomputer 5 so that the gamma curve linearly changes from "γ0" to "γ2". Further, a gamma curve between APL3 and APL4 is also determined so that the gamma curve linearly changes from "γ2" to "γ3". In FIG. 2A, if the luminance-histogram middle area is selected, the gamma curve characteristic is switched as shown in FIG. 2D. If the luminance-histogram low area is selected, the gamma curve characteristic is switched as shown in FIG. 2E. The arithmetic processing performed here is similar to that performed when the luminance-histogram high area is selected. Incidentally, one of the three areas is usually selected at the time of the area selection. However, if no area is selected, for example, the gamma curve "γ1" is set.

As described above, in this embodiment, a characteristic of an input image signal is made clear by a luminance histogram; and an area, which is suitable for the characteristic, is selected more than once. Moreover, by analyzing the luminosity of the whole input image by the APL, it becomes possible to automatically select, within a range from "γ0" to "γ3", a nonlinear gamma curve characteristic that is most suitable for the luminosity (APL) of the input image signal, and to makes the adaptation to the selected gamma curve characteristic. This makes it possible to improve the impression of contrast so that the contrast becomes suitable for the luminosity of the input image signal.

Figure 3A:
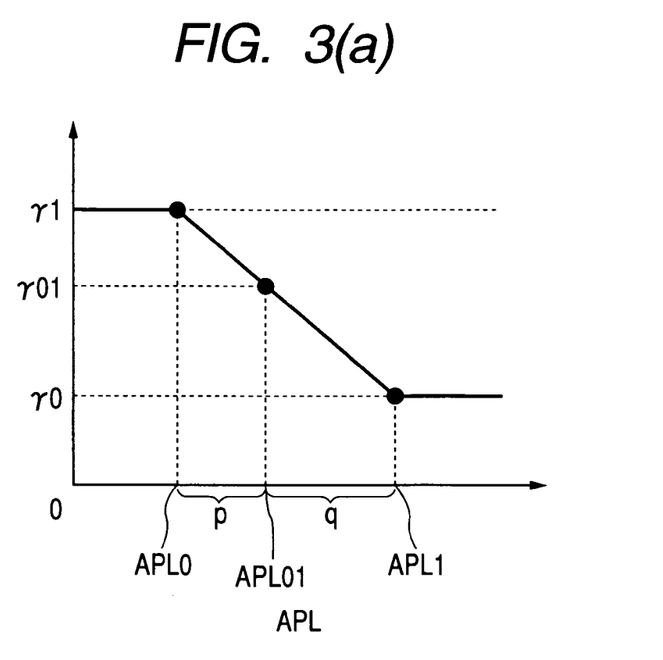
FIGS. 3A, 3B are graphs each illustrating the relationship between the gamma-curve switching characteristic and an APL according to the present invention.
Figure 3B:
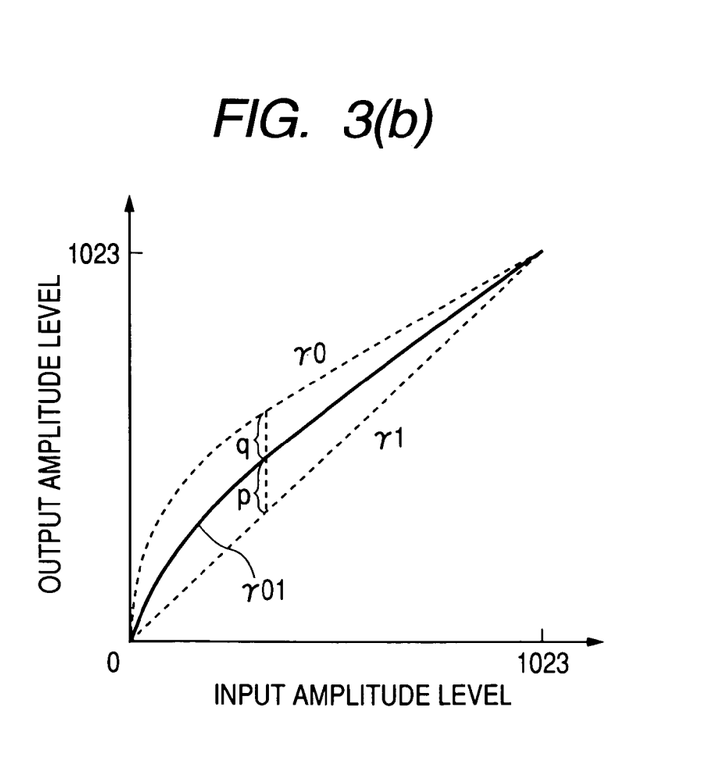

What will be described next with reference to FIGS. 3A, 3B is a calculation method for calculating a gamma curve characteristic at an APL between the APL switching points illustrated in FIG. 2C. The gamma curve characteristic is determined by the arithmetic operation of the microcomputer 5. FIG. 3A is a graph illustrating a gamma-curve switching characteristic between APL0 and APL1 in FIG. 2C. For example, when an APL of the input image signal is APL01, a gamma curve characteristic of APL01 corresponding to "γ01", which exists between "γ1" selected in APL0 and "γ0" selected in APL1, is determined by the arithmetic operation of the microcomputer 5. This APL01 is a point that is away from APL0 by a distance of p, and that is away from APL1 by a distance of q. In other words, because a ratio of the distance between APL01 and APL0 to the distance between APL01 and APL1 is p:q, the gamma curve "γ01" is determined from the gamma curve characteristics "γ1" and "γ0" by means of calculation so that a ratio of the distance between "γ01" and "γ1" to the distance between "γ01" and "γ0" is p:q.

FIG. 3B is a graph illustrating a gamma curve characteristic of "γ01". On the assumption that a ratio of the distance between "γ01" and "γ1" to the distance between "γ01" and "γ0" is p:q when considering a gamma curve characteristic in which both input and output amplitude levels are 1023, "γ01" is determined by the arithmetic operation of the microcomputer 5. In other words, when APL1 of the input image signal is AL01, this gamma curve becomes the most suitable gamma curve characteristic. As a result, within a range from APL0 to APL1, the arithmetic operation of a gamma curve characteristic which is proportional to the APL of the input image signal becomes possible. This is the gamma correction processing in conjunction with the APL. Also in the case of the other APL switching points, suitable gamma curves can be determine by carrying out arithmetic operation similar to that described above. To be more specific, also when calculating a gamma curve between "γ1" and "γ2" and a gamma curve between "γ2" and "γ3", a similar calculation method is used. Even if a tilt thereof is upward from left to right, or even if the tilt is downward from left to right, gamma curves are calculated in a like manner. Although FIG. 2C was described here, the gamma correction processing is also performed for FIG. 2D or FIG. 2E by a similar calculation method.

Grayscale extension processing according to this embodiment will be described with reference to FIGS. 4A, 4B, 4C, 5A, 5B, 5C. In the grayscale extension processing, on the basis of the result of detecting the luminance histogram by the luminance characteristic detector 4 shown in FIG. 1, the characteristic emphasis circuit 7 further extends the grayscale of a plurality of characteristic areas relative to the gamma curve to which the gamma correction circuit 6 has made the adaptation.

Figure 4A:
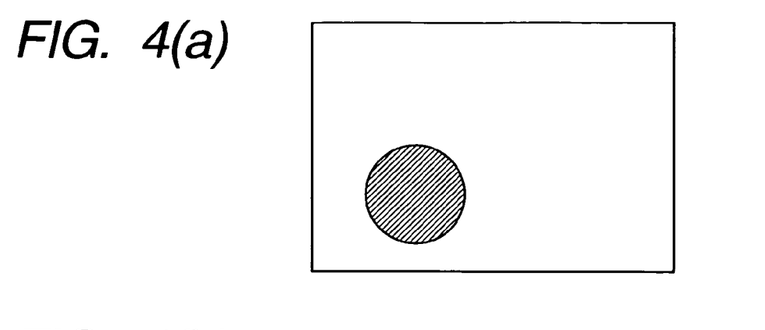
FIGS. 4A, 4B, 4C illustrate a judgment method of a characteristic area according to the present invention, which is used when the luminance of an input image signal is high as a whole, and also illustrate the result after extending the grayscale.

FIG. 4A is a diagram illustrating an example of an image formed by an input image signal. Here, the luminance of the image is high as a whole although it is partially low. When considering the image in FIG. 4A, with the object of extending the grayscale in a high luminance area by the gamma correction circuit 6, gamma curve characteristics to be selected are as follows: increasing the amount of tilt of a gamma curve of a high luminance area such as "γ2" and "γ3"; and decreasing the amount of tilt of a gamma curve of a low luminance area. In this case, although the impression of contrast of the image is improved in the high luminance area, the impression of contrast of the image becomes worse in the low luminance area. Accordingly, there is a possibility that the image will be collapsed. For this reason, the impression of contrast of the image in both the high luminance area and the low luminance area is improved by the characteristic emphasis circuit 7. In addition to it, the grayscale extension processing is carried out to prevent the image from being collapsed.

Figure 4B:
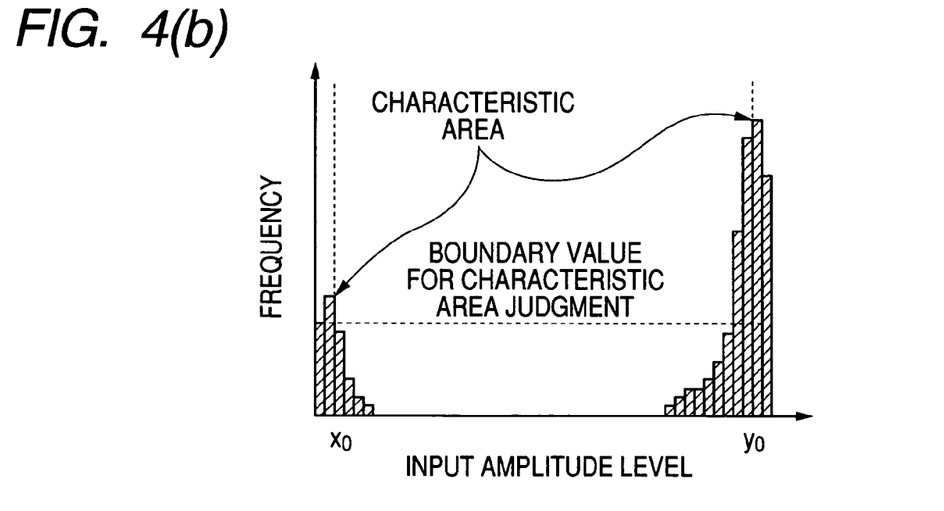

FIG. 4B is a graph illustrating the calculation result of the luminance histogram for the image signal shown in FIG. 4A. It is found out from FIG. 4B that because the image signal in FIG. 4A mainly includes the high luminance area, the calculation result of the luminance histogram also shows the high frequency of the high luminance area. Moreover, judging from this figure, it is also understood that because no part of the image is included in a middle luminance area, no frequency of the middle luminance area is shown, and that because part of the image is included in a low luminance area, a frequency of the low luminance area is also shown to some extent. In this case, first of all, the microcomputer 5 judges that an area of the input image signal is a luminance-histogram high area. Then, according to the switching of gamma curve characteristics for luminance-histogram high areas as shown in FIG. 2C, gamma curves corresponding to the APL of the input image signal (for example, "γ2" and "γ3") are set in the gamma correction circuit 6. In addition, if an area in which the frequency is high (for example, areas in proximity to x0 and y0 in FIG. 4B) exceeds a boundary value for characteristic area judgment predetermined by the microcomputer 5, the area is analyzed as a characteristic area, which is then selected. The characteristic emphasis circuit 7 further extends the grayscale of the selected characteristic area. A ratio in which the grayscale is extended is determined by the frequency. The grayscale extension processing will be described in detail with reference to subsequent FIG. 6.

Figure 4C:
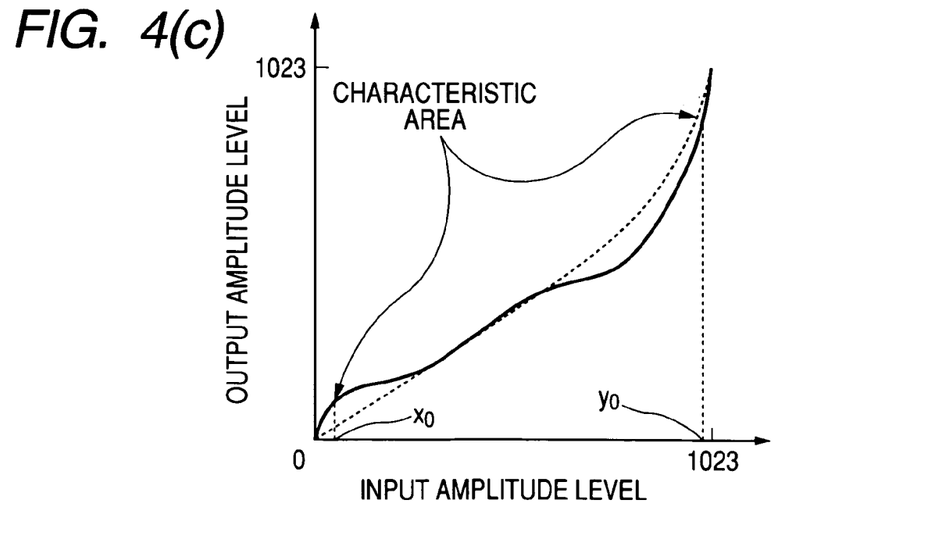

FIG. 4C is a graph illustrating the output result of gamma curves in which the grayscale of the characteristic areas x0 and y0 selected in FIG. 4B is extended relative to the gamma curve corrected by the gamma correction circuit 6. A gamma curve indicated with a dotted line in the figure is the gamma curve to which the gamma correction circuit 6 has made the adaptation. By extending the grayscale of the characteristic areas x0 and y0 relative to the gamma curve indicated with the dotted line, a nonlinear gamma curve indicated with a solid line is made. It is understood that the amount of tilt of the latter gamma curve more steeply increases in the characteristic areas x0 and y0 in comparison with that of the former gamma curve, and that the tilt is upward from left to right. This makes it possible to express an image in which the grayscale of characteristic areas x0 and y0 is extended and thereby the impression of contrast for the areas is improved. To be more specific, the collapse in the low luminance area, which is thought to be caused by the gentle tilt of the gamma curve, can also be improved by use of this technique.

Figure 5A:
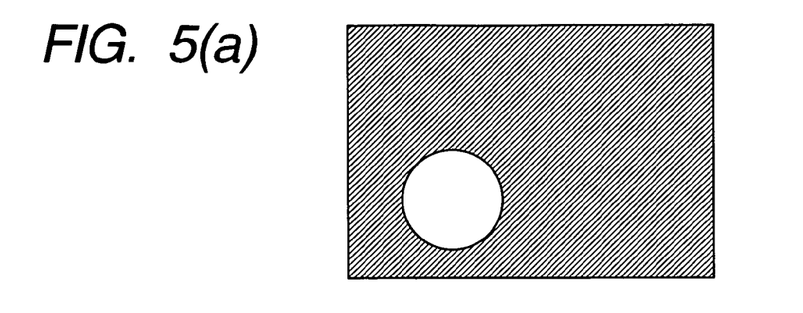
FIGS. 5A, 5B, 5C illustrate a judgment method of a characteristic area according to the present invention, which is used when the luminance of an input image signal is low as a whole, and also illustrate the result after extending the grayscale.

FIG. 5A is a diagram illustrating an example of an image formed by an input image signal. In contrast to FIG. 4A, the luminance of the image is low as a whole although it is partially high. When considering the image in FIG. 5A, with the object of extending the grayscale in a low luminance area by the gamma correction circuit 6, gamma curve character- istics to be selected are as follows: increasing the amount of tilt of a gamma curve of a low luminance area such as "γ0"; and decreasing the amount of tilt of a gamma curve of a high luminance area. In this case, although the impression of contrast of the image is improved in the low luminance area, the impression of contrast of the image becomes worse in the high luminance area. Accordingly, there is a possibility that the image will be collapsed. For this reason, the impression of contrast of the image in both the high luminance area and the low luminance area is improved by the characteristic emphasis circuit 7. In addition to it, the grayscale extension processing is carried out to prevent the image from being collapsed.

Figure 5B:
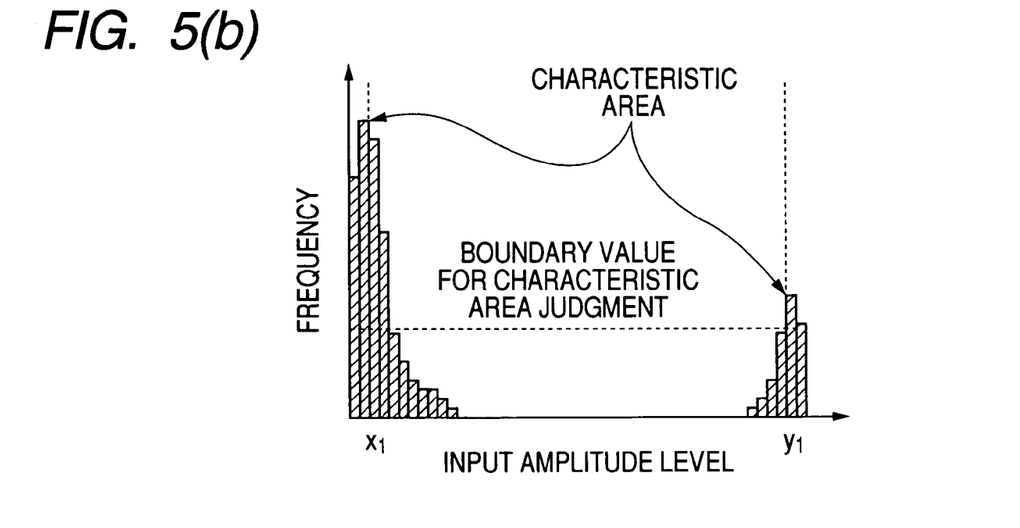

FIG. 5B is a graph illustrating the calculation result of the luminance histogram for the image signal shown in FIG. 5A. It is found out from FIG. 5B that because the image signal in FIG. 5A mainly includes the low luminance area, the calculation result of the luminance histogram also shows a high frequency of the low luminance area. Moreover, judging from this figure, it is also understood that because no part of the image is included in a middle luminance area, no frequency of the middle luminance area is shown, and that because part of the image is included in a high luminance area, a frequency of the high luminance area is also shown to some extent. In this case, first of all, the microcomputer 5 judges that an area of the input image signal is a luminance-histogram low area. Then, according to the switching of gamma curve characteristics for luminance-histogram low areas as shown in FIG. 2E, a gamma curve corresponding to the APL of the input image signal (for example, "γ0") is set in the gamma correction circuit 6. In addition, if an area characterized by the high frequency (for example, areas in proximity to x1 and y1 in FIG. 5B) exceeds a boundary value for characteristic area judgment predetermined by the microcomputer 5, the area is analyzed as a characteristic area, which is then selected. The characteristic emphasis circuit 7 further extends the grayscale of the selected characteristic area. A ratio in which the grayscale is extended is determined by the frequency.

Figure 5C:
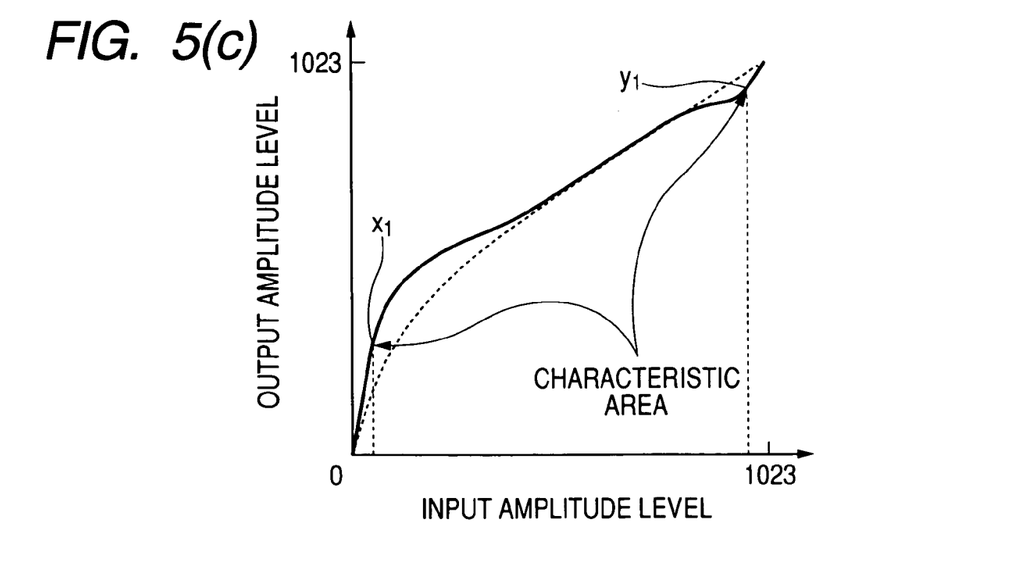

FIG. 5C is a graph illustrating the output result of gamma curves in which the grayscale of the characteristic areas x1 and y1 selected in FIG. 5B is extended relative to the gamma curve to which the gamma correction circuit 6 has made the adaptation. A gamma curve indicated with a dotted line in the figure is the gamma curve to which the gamma correction circuit 6 has made the adaptation. By extending the grayscale of the characteristic areas x1 and y1 relative to the gamma curve indicated with the dotted line, a nonlinear gamma curve indicated with a solid line is made. It is understood that the amount of tilt of the latter gamma curve more steeply increases in the characteristic areas x1 and y1 in comparison with that of the former gamma curve, and that the tilt is upward from left to right. This makes it possible to express an image in which the grayscale of characteristic areas x1 and y1 is extended and thereby the impression of contrast for the areas is improved. To be more specific, the collapse in the high luminance area, which is thought to be caused by the gentle tilt of the gamma curve, can also be improved by use of this technique.

Figure 6:
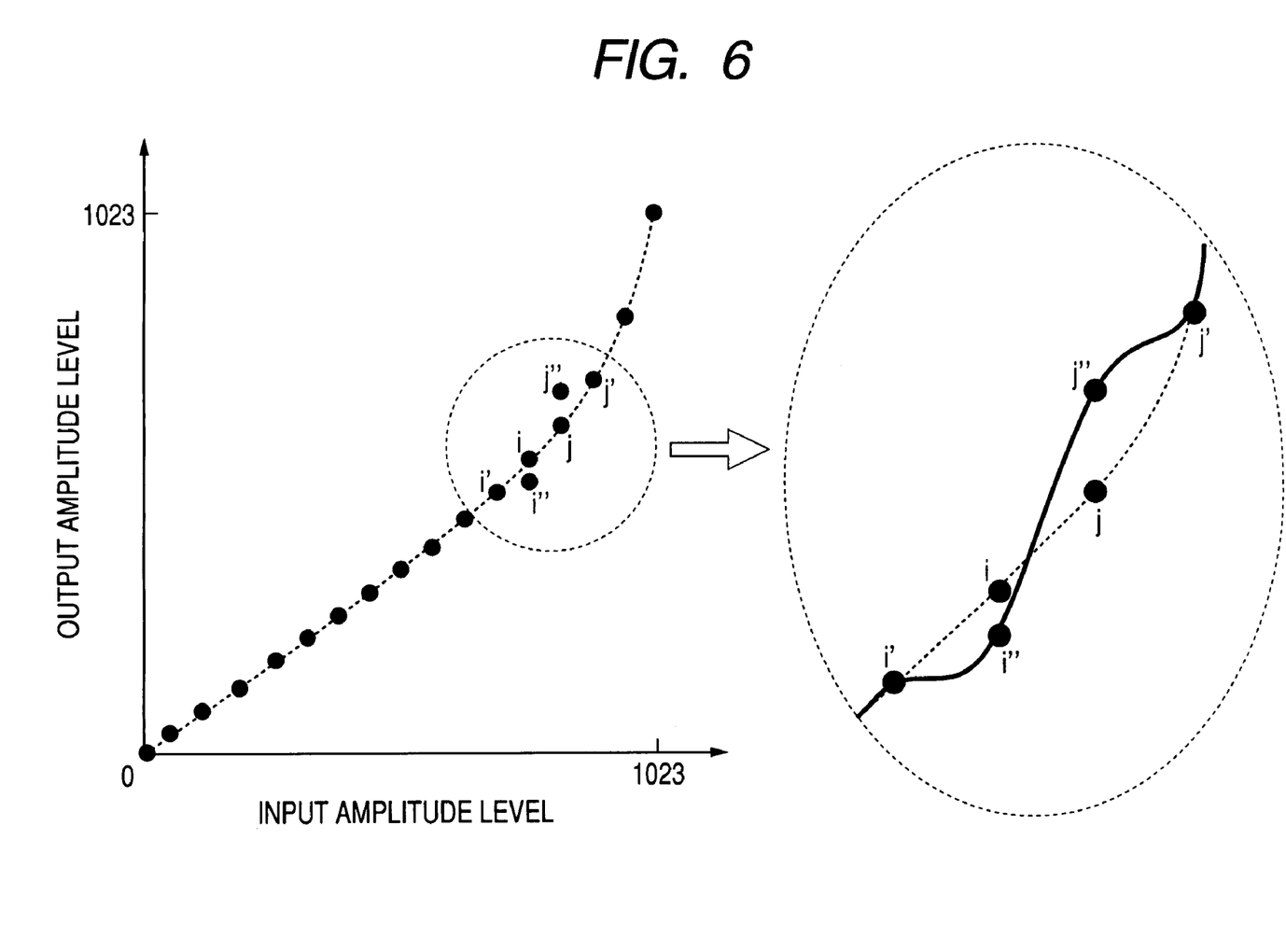
FIG. 6 is a graph illustrating a method for extending the grayscale according to the present invention.

A method for extending the grayscale of a characteristic area by the characteristic emphasis circuit 7 will be described with reference to FIG. 6. In this figure, if the characteristic area ranges from a point i to a point j, the grayscale thereof is extended by making a gamma curve between i and j steep. As a method for making the gamma curve steep, there is a method in which the point i is lowered to make a point i", and the point j is raised to make a point j", relative to the points i and j that are originally provided along the gamma curve indicated by a dotted line in the figure, said gamma curve being generated by the gamma correction circuit 6. The maximum value of a ratio of lowering dr, and that of a ratio of raising ur, are arbitrarily set in advance. Then, according to a control signal calculated by the microcomputer 5, on the basis of a luminance histogram calculated by the luminance characteristic detector 4, the characteristic emphasis circuit 7 multiplies each of dr and ur by fr. Here, fr is a ratio of the amount by which the frequency in a characteristic area exceeds a certain boundary value. As a result, output amplitude levels of the points i" and j" are determined. FIG. 6 shows that as a result of the control of lowering i, and of raising j, the points i" and j" are made. However, by making the value of either dr or ur equal to 0, it is also possible to raise only the point j of the characteristic area to make only the point j" with the point i being kept unchanged, or, it is also possible to raise only the point i of the characteristic area to make only the point i" with the point j being kept unchanged. However, raising the point i, and lowering the point j, cause the tilt of the gamma curve in the characteristic area to become the steepest, which makes it possible to improve the impression of the contrast. In FIG. 6, the number of areas where the grayscale is to be extended is only one. However, even if there are a plurality of characteristic areas, the impression of the contrast can be improved in the same manner, and the characteristic areas can be consecutively handled. In this case, in order to make a target point to be calculated now larger than or equal to the next point on the left side, it is necessary to carry out the correction processing so that the following relationship always holds: i'<i"; i"<j"; and j"<j'. This is because if the next point on the left side is larger than the target point to be calculated, the breakage of an image occurs.

As for the gamma curves which have been output as a result of the processing by the gamma correction circuit 6 and the characteristic emphasis circuit 7, in contrast to "γ1" having reference linear input/output characteristics, the color correction circuit 8 decreases the amplitude of saturation for gamma curves (for example, "γ2" and "γ3") in which an output amplitude level is lower than an input amplitude level. As far as the gamma curve characteristics are concerned, if the output amplitude level is lower than the input amplitude level, the color becomes deep, which may cause color collapse, or the like. For this reason, by use of the ratio of distance used by the gamma correction circuit 6, which was described with reference to FIG. 3B, the amplitude of saturation is adjusted in response to the ratio. This makes it possible to set the color density that is suitable for the corrected gamma curve, and accordingly it becomes possible to prevent the color collapse, or the like, from occurring.

As described above, after the processing by both the gamma correction circuit 6 and the characteristic emphasis circuit 7, the gamma curve characteristics according to this embodiment are obtained by performing the gamma correction processing for the plurality of nonlinear characteristic areas. For example, in the case of an image that is bright as a whole, the gamma correction circuit 6 carries out the gamma correction processing by use of the APL and the luminance histogram to extend the grayscale of a high luminance area. Next, the characteristic emphasis circuit 7 analyzes the luminance histogram to identify a characteristic area. Then, the grayscale of the identified characteristic area is extended so that a gamma curve suitable for an input image signal is generated. On the other hand, in the case of an image that is dark as a whole, the gamma correction circuit 6 carries out the gamma correction processing by use of the APL and the luminance histogram to extend the grayscale of a low luminance area. Next, the characteristic emphasis circuit 7 analyzes the luminance histogram to identify a characteristic area. Then, the grayscale of the identified characteristic area is extended so that a gamma curve suitable for an input image signal is generated. Thus, performing the gamma correction processing by both the gamma correction circuit 6 and the characteristic emphasis circuit 7 makes it possible to appropriately carry out the gamma correction regardless of a kind of an input image signal. In this embodiment, for example, even if an inputted image, the luminance of which is high as a whole, partially includes an area, the luminance of which is low, or even if an inputted image, the luminance of which is low as a whole, partially includes an area, the luminance of which is high, it is possible to calculate, from a plurality of gamma curves, a gamma curve that is most suitable for such an input image signal. Thus, according to this embodiment, it is possible to extend the grayscale of all areas, the impression of contrast of which is to be improved.

Second Embodiment

Figure 7:
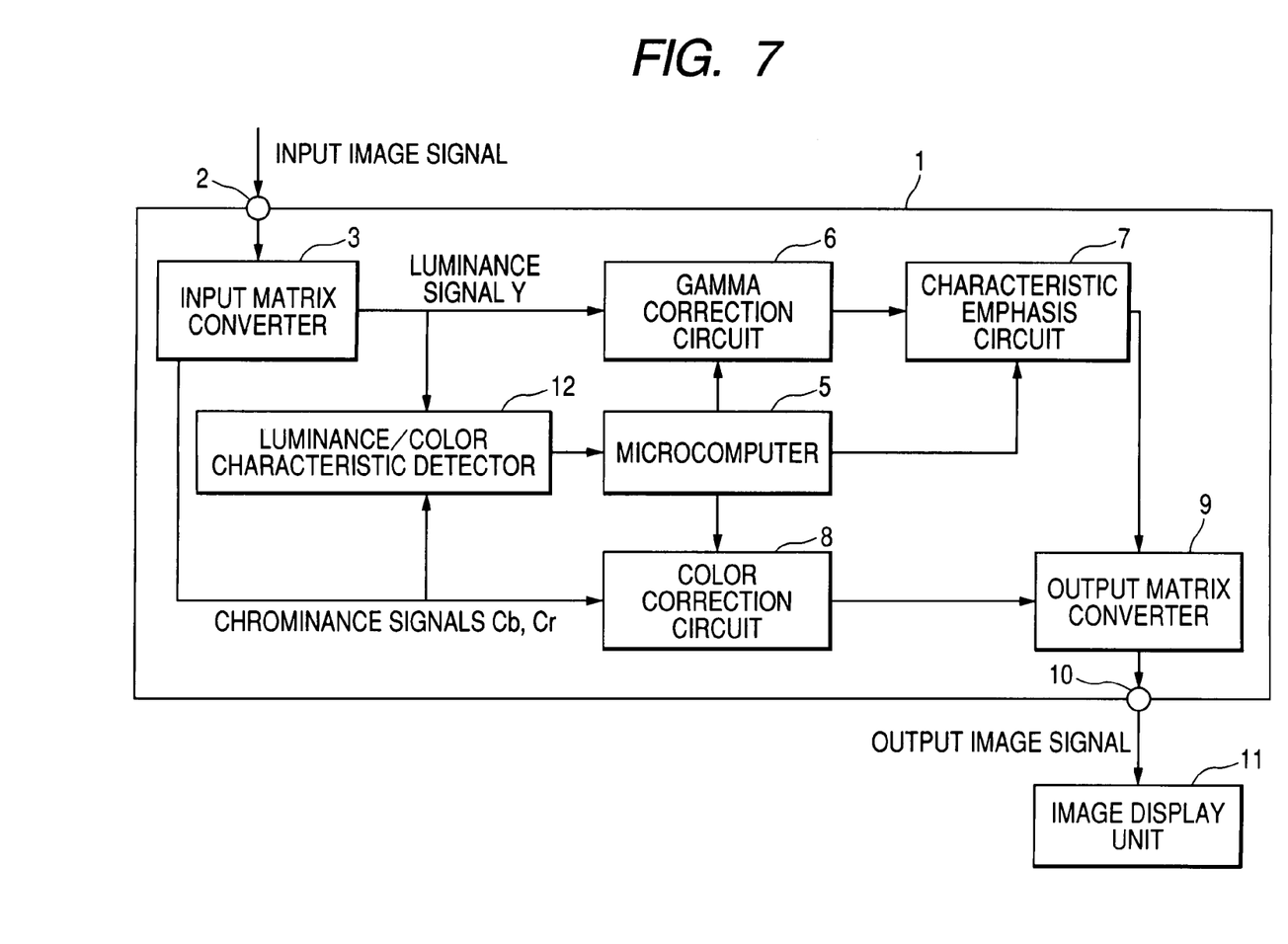
FIG. 7 is a basic configuration diagram illustrating an image processing circuit according to a second embodiment of the present invention.

FIG. 7 is a block diagram illustrating an image processing unit according to a second embodiment of the present invention. Instead of the luminance characteristic detector 4 shown in FIG. 1, what is used in this embodiment is a luminance/color characteristic detector 12 that detects an APL, a luminance histogram, and hue/saturation histograms by use of a luminance signal Y and chrominance signals Cb, Cr. Incidentally, the same parts as those shown in FIG. 1 are designated by similar reference numerals, and repeated description thereof will be omitted.

In FIG. 7, the luminance/color characteristic detector 12 detects the APL, the luminance histogram, and the hue/saturation histograms in a period of one field or one frame by use of the luminance signal Y and the chrominance signals Cb, Cr that have been converted from an input image signal by the input matrix converter 3. As for the luminance signal Y, the same control as that described in the first embodiment is performed. Therefore, description thereof will be omitted here. Information about the hue/saturation histograms detected by the luminance/color characteristic detector 12 is inputted into the microcomputer 5. The microcomputer 5 analyzes, from the inputted information about the hue/saturation histograms, distribution characteristics of the hue histogram and those of the saturation histogram relating to each hue. Then, the microcomputer 5 creates a color control signal according to the result of the analysis, and outputs the color control signal to the color correction circuit 8. The color correction circuit 8 adjusts the amplitude of saturation on a hue basis using the color control signal created by the microcomputer 5, and then outputs the adjusted signal to the output matrix converter 9. Thereafter, the same control as that described in the first embodiment is performed.

How to adjust the amplitude of saturation according to this embodiment will be described in detail as below. The luminance/color characteristic detector 12, the microcomputer 5, and the color correction circuit 8 execute the adjustment on the basis of the detected hue/saturation histograms.

Figure 8:
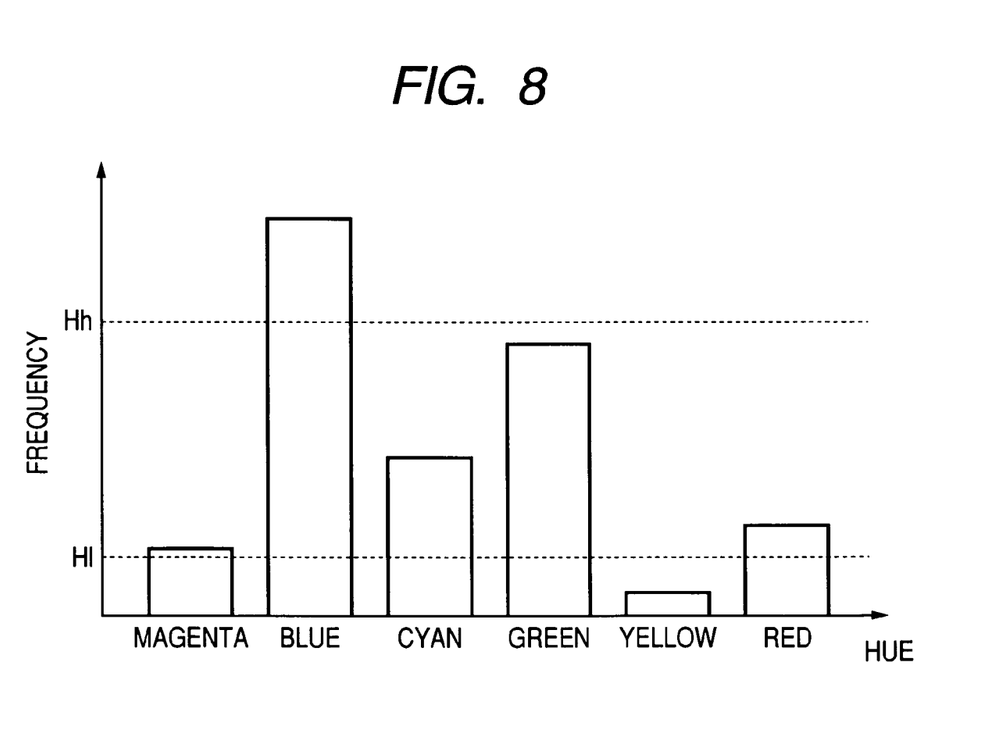
FIG. 8 illustrates as an example the result of detecting a hue histogram according to the present invention.

First of all, the result of detecting the hue/saturation histograms by the luminance/color characteristic detector 12 will be shown as an example in FIG. 8. As shown in the figure, the hue histogram represents the frequency of each hue for an input image signal. This makes it possible to analyze the tendency, and the frequency, of color in the inputted image signal.

Figure 9A:
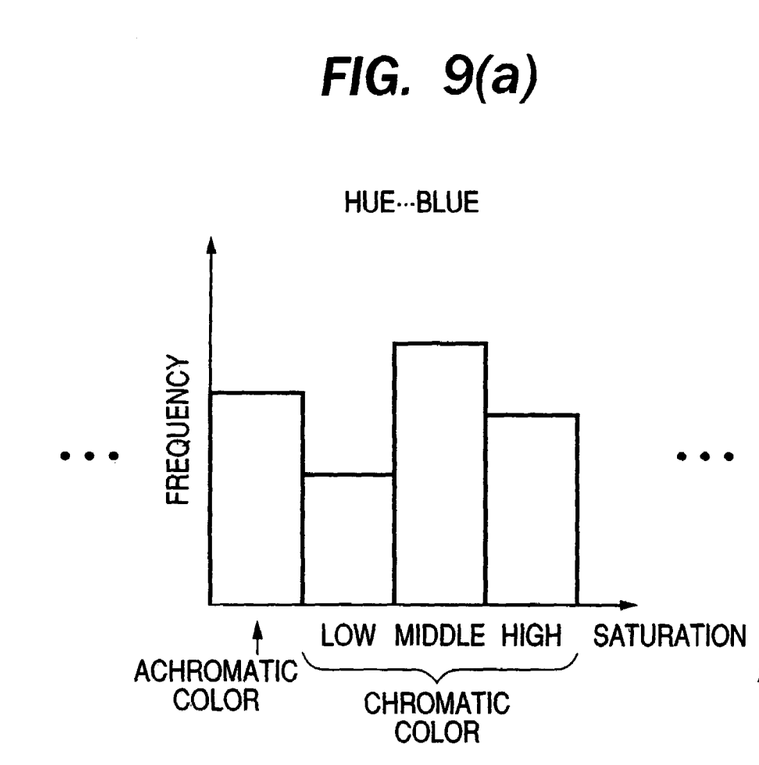
FIGS. 9A, 9B illustrate, as examples, the result of detecting saturation histograms according to the present invention.
Figure 9B:
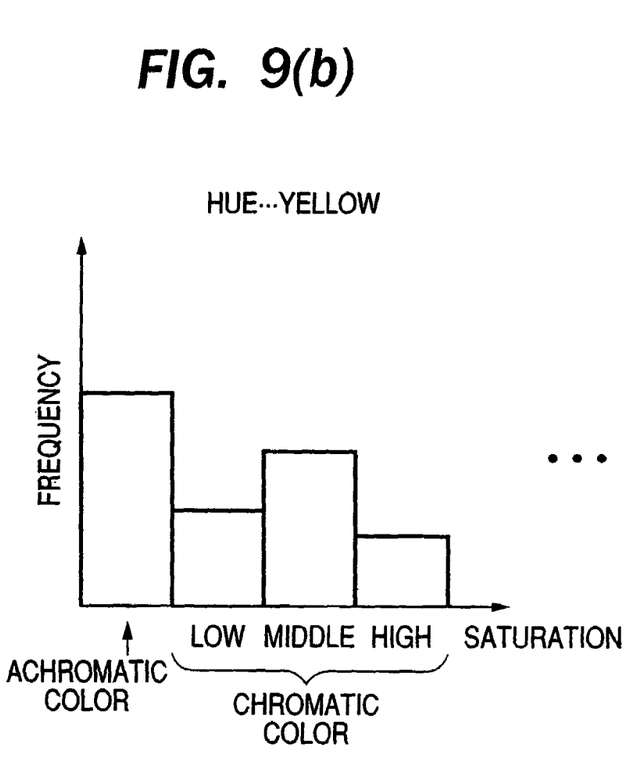

Next, the result of detecting the hue/saturation histograms by the luminance/color characteristic detector 12 will be shown as an example in FIG. 9. As shown in the figure, a saturation histogram for each hue is divided into four areas of an achromatic color area, a saturation low area, a saturation middle area, and a saturation high area. In the case of the achromatic color, it is a state of no color. In other words, it is a state in which white and/or black is included. In the case of the chromatic color, if the saturation is higher, the color becomes deeper and brighter, whereas if the saturation is lower, the color becomes lighter. To be more specific, in the saturation histogram according to this embodiment, when the saturation is high, the frequency of the brightest color is shown; when the saturation is low, the frequency of dull color is shown; and when the saturation is middle, the frequency of neutral color, the saturation of which is intermediate between the high saturation and the low saturation, is shown. In FIG. 9, the saturation histograms, hues of which are blue and yellow, are taken as examples. However, it is possible to arbitrarily select the number of hues in this embodiment. Because of it, it is also possible to calculate many saturation histograms included in the input image signal.

Figure 10A:
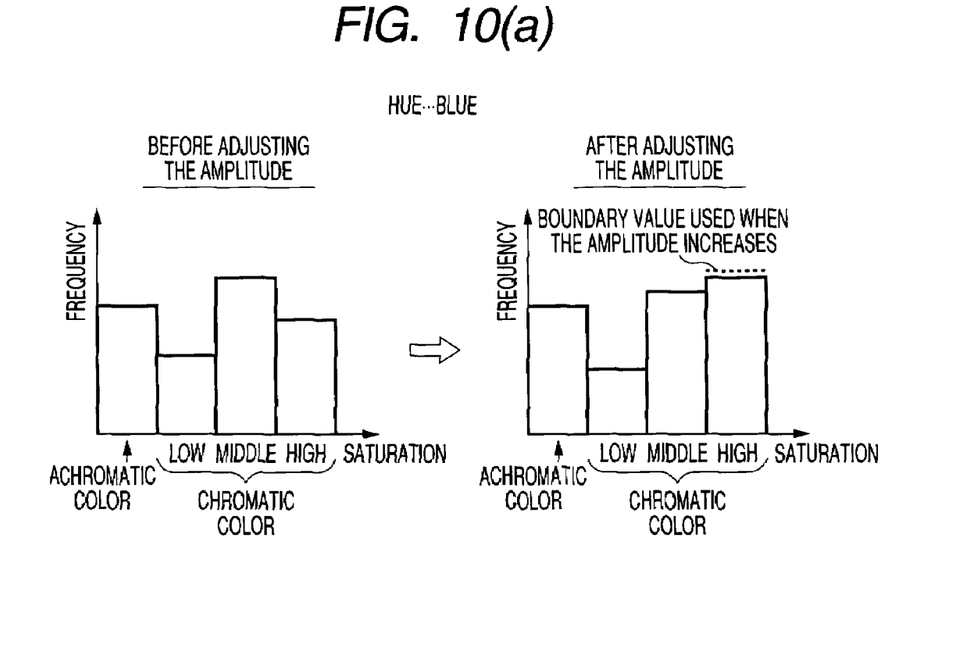
FIGS. 10A, 10B illustrate how to adjust the amplitude of saturation according to the present invention.
Figure 10B:
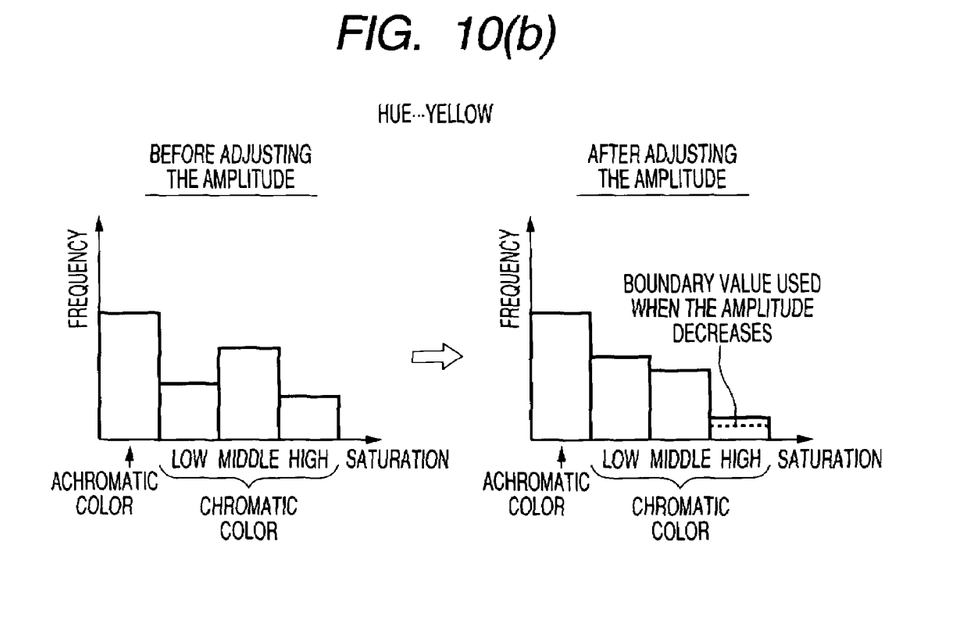

In this embodiment, the amplitude of saturation is adjusted by use of the hue histogram and the saturation histogram. To be more specific, the microcomputer 5 analyzes the hue histogram to determine the most predominant color and the least predominant color on the basis of a specified boundary value Hh used to judge that the frequency is high, and a specified boundary value Hl used to judge that the frequency is low. For example, according to the hue histogram shown in FIG. 8, it is judged that the color, the frequency of which is higher than the boundary value Hh, is blue, and that the color, the frequency of which is lower than the boundary value Hl, is yellow. FIGS. 10A, 10B illustrate the result of adjusting the amplitude of saturation for blue and yellow respectively (that is to say, the saturation histograms after adjusting the amplitude) as well as the saturation histograms shown in FIG. 9 (that is to say, the saturation histograms before adjusting the amplitude). Because the frequency of blue shown in FIG. 10A exceeds the boundary value Hh, the amplitude of saturation is increased. As a result of it, the frequency of high saturation after the adjustment becomes higher as compared with that before the adjustment. Accordingly, the color is displayed more brightly. However, if the frequency of high saturation excessively increases, the color becomes too bright. Accordingly, there is a possibility that the color collapse will occur. For this reason, an upper limit of the frequency at the time of increasing the amplitude is given to the saturation high area (it is designated as "a boundary value used when the amplitude increases"). The color collapse is avoided by controlling the frequency not to exceed the boundary value.

Because the frequency of yellow shown in FIG. 10B is lower than the boundary value Hl, the amplitude of saturation is decreased. As a result of it, the frequency of high saturation after the adjustment becomes lower as compared with that before the adjustment. Accordingly, the color is displayed less brightly. However, if the frequency of high saturation excessively decreases, the color becomes too thin. Accordingly, there is a possibility that the color will become perfectly unobtrusive. For this reason, a lower limit of the frequency at the time of decreasing the amplitude is given to the saturation high area (it is designated as "a boundary value used when the amplitude decreases"). The above-mentioned possibility is avoided by controlling the frequency not to become lower than the boundary value. A degree to which the amplitude of saturation is adjusted in the hue histogram is determined as follows: if the frequency becomes higher than the boundary value Hh, using as the degree the difference between the boundary value Hh and a vertex of the result of the histogram; and if the frequency becomes lower than the boundary value Hl, using as the degree the difference between the boundary value Hl and the vertex of the result of the histogram. As a result, a degree to which the amplitude is increased, or a degree to which the amplitude is decreased, is determined. As another method for adjusting the amplitude of saturation, a degree to which the amplitude is increased, or a degree to which the amplitude is decreased, is determined by use of a ratio between the distance to the boundary value Hh and the distance to the boundary value Hl for each color, the frequency of which stays within the range between the boundary value Hh and the boundary value Hl in the hue histogram.

As described above, according to this embodiment, the amplitude of saturation can be adjusted on the basis of both the hue histogram shown in FIG. 8 and the saturation histogram shown in FIG. 9, which are calculated by the microcomputer 5. For example, if color should be emphasized because the frequency of the color is high in the hue histogram, the amplitude of saturation can be increased. On the other hand, if color should not be emphasized because the frequency of the color is low in the hue histogram, the amplitude of saturation can be decreased. Thus, in addition to the effects produced in the first embodiment (the improvement in contrast achieved by extending the grayscale using the luminance histogram), effects produced in this embodiment include the capability of displaying an image, the sharpness of color of which is emphasized by making the color brighter. To be more specific, according to this embodiment, the color correction of chrominance signals Cb, Cr by use of the hue/saturation histograms makes it possible to set the saturation that is most suitable for each color. As a result, it becomes possible to prevent the color from getting thinner, and thereby to prevent the image from being dimmed. It also becomes possible to prevent the color from getting deeper, and thereby to prevent the image from becoming difficult to be seen.

What is claimed is:

1. An image display apparatus comprising:
    a characteristic detector for detecting, from an inputted image signal, an average luminance level and a luminance histogram in a given period of time as characteristics of the image signal;
    a first grayscale correction unit for correcting the grayscale of the image signal by use of the detected average luminance level and the detected luminance histogram in combination; and
    a second grayscale correction unit for determining a characteristic area characterized by a luminance distribution that is higher than a specified value, and for correcting the grayscale of a signal coming from the first grayscale correction unit, the signal being associated with the characteristic area.

2. An image display apparatus according to claim 1, wherein:
    said characteristic detector detects an average luminance level and a luminance histogram in a period of one field or one frame.

3. An image display apparatus according to claim 1, further comprising:
a controller for controlling the first and second grayscale correction units on the basis of the average luminance level and the luminance histogram detected by the characteristic detector.

4. An image display apparatus according to claim 3, wherein:
said first grayscale correction unit is a gamma correction circuit that subjects the image signal to gamma correction for grayscale correction;
said controller selects a gamma curve corresponding to the detected average luminance level from among a plurality of predetermined gamma curves, and then gives the selected gamma curve to the gamma correction circuit; and
said gamma correction circuit corrects the grayscale of the image signal on the basis of the gamma curve given by the controller.

5. An image display apparatus according to claim 4, wherein:
said controller has gamma-curve switching characteristics associated with each of a plurality of luminance histogram areas;
judging from the luminance histogram detected by the characteristic detector, said controller determines a luminance histogram area associated with the image signal from among the plurality of luminance histogram areas; and
by use of the switching characteristic associated with the determined luminance histogram area, said controller switches the plurality of gamma curves in response to the detected average luminance level.

6. An image display apparatus according to claim 1, wherein:
said second grayscale correction unit is a characteristic emphasis unit for extending the gray scale of a signal coming from the first grayscale correction unit, the signal being associated with the characteristic area.

7. An image display apparatus comprising:
a characteristic detector for detecting, from an inputted image signal, an average luminance level and a luminance histogram in a given period of time as characteristics of the image signal;
a grayscale correction unit for correcting the grayscale of the image signal by use of the detected average luminance level and the detected luminance histogram in combination;
a characteristic emphasis unit for, with respect to the image signal, the grayscale of which has been corrected by the grayscale correction unit, further correcting the grayscale of a signal associated with the characteristic area that has been determined by use of the detected luminance histogram; and
a controller for controlling the grayscale correction unit and the characteristic emphasis unit on the basis of the average luminance level and the luminance histogram that have been detected by the characteristic detector.

8. An image display apparatus according to claim 7, wherein:
from the detected luminance histogram, said controller judges an area, the frequency of which exceeds a specified value, to be the characteristic area; and
said characteristic emphasis unit extends the grayscale of a signal coming from the grayscale correction unit, the signal associated with the characteristic area judged by the controller.

9. An image display apparatus according to claim 7, wherein:
if the controller judges that there are a plurality of characteristic areas in a given period of time, said characteristic emphasis unit individually extends each grayscale of a signal coming from the grayscale correction unit, said signal associated with the plurality of characteristic areas.

10. An image display apparatus comprising:
a characteristic detector for detecting, from an inputted image signal, a hue histogram that indicates a frequency distribution on a hue basis for the image signal in a given period of time as a color histogram;
a correction unit for correcting the color saturation of the image signal on the basis of the hue histogram detected by the characteristic detector; and
a controller for determining a hue, the frequency of which exceeds a specified value, from the hue histogram detected by the characteristic detector,
wherein:
said correction unit corrects the image signal so that the color saturation thereof is made larger with respect to the hue, the frequency of which exceeds the specified value, said hue being determined by the controller.

11. An image display apparatus comprising:
a characteristic detector for detecting, from an inputted image signal, an average luminance level and a luminance histogram;
a gamma correction unit for correcting the grayscale of the image signal on the basis of the result of the detection by the characteristic detector;
a characteristic emphasis unit for, from the luminance histogram detected by the characteristic detector, determining a characteristic area characterized by a luminance distribution that is higher than a specified value, and performing grayscale extension processing that extends the grayscale of an image signal coming from the gamma correction unit, said image signal being associated with the characteristic area; and
a color correction unit for adjusting the amplitude of color saturation on the basis of the gamma correction processing.

12. An image display apparatus comprising:
a characteristic detector including a luminance characteristic detector for detecting, from an inputted image signal, an average luminance level and a luminance histogram, and a color characteristic detector for detecting a color histogram;
a gamma correction unit for correcting the grayscale of the image signal on the basis of the result of the detection by the luminance characteristic detector;
a characteristic emphasis unit for, from the luminance histogram detected by the characteristic detector, determining a characteristic area characterized by a luminance distribution that is higher than a specified value, and performing grayscale extension processing that extends the grayscale of an image signal coming from the gamma correction unit, said image signal being associated with the characteristic area; and
a color correction unit for, on the basis of the result of the detection by the color characteristic detector, analyzing the hue, and the color saturation, of the image signal to correct the color saturation of the image signal.

* * * * *